(12) United States Patent
Yasuda et al.

(10) Patent No.: US 10,465,797 B2
(45) Date of Patent: Nov. 5, 2019

(54) GASKET

(71) Applicants: ISHIKAWA GASKET CO., LTD., Tokyo (JP); Mitsubishi Jidosha Kogyo Kabushiki Kaisha, Tokyo (JP)

(72) Inventors: Kisho Yasuda, Tokyo (JP); Akira Yoshihara, Tokyo (JP); Hiroki Imada, Tokyo (JP); Masayuki Yano, Tokyo (JP); Kunitoshi Kajiwara, Tokyo (JP)

(73) Assignees: ISHIKAWA GASKET CO., LTD., Tokyo (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/035,875

(22) Filed: Jul. 16, 2018

(65) Prior Publication Data
US 2019/0024798 A1    Jan. 24, 2019

(30) Foreign Application Priority Data
Jul. 18, 2017    (JP) .................................. 2017-139207

(51) Int. Cl.
*F16J 15/08* (2006.01)
*B32B 15/01* (2006.01)

(52) U.S. Cl.
CPC ......... *F16J 15/0825* (2013.01); *B32B 15/011* (2013.01); *B32B 2581/00* (2013.01); *F16J 2015/085* (2013.01); *F16J 2015/0837* (2013.01); *F16J 2015/0862* (2013.01)

(58) Field of Classification Search
CPC ............. F16J 15/0825; F16J 2015/0837; F16J 2015/085; F16J 2015/0862; B32B 15/011; B32B 2581/00
See application file for complete search history.

(56) References Cited

U.S. PATENT DOCUMENTS

| | | | | |
|---|---|---|---|---|
| 5,582,415 A | * | 12/1996 | Yoshida | F16J 15/0825 277/592 |
| 5,938,208 A | * | 8/1999 | Yoshida | F16J 15/0818 277/592 |
| 8,267,407 B2 | * | 9/2012 | Schmucker | F16J 15/0825 277/593 |

FOREIGN PATENT DOCUMENTS

| | | |
|---|---|---|
| JP | 1993032871 A | 4/1993 |
| JP | 1999118038 A | 4/1999 |
| JP | 2010156388 A | 7/2010 |

* cited by examiner

*Primary Examiner* — Gilbert Y Lee
(74) *Attorney, Agent, or Firm* — Greer Burns & Crain, Ltd.

(57) ABSTRACT

A gasket capable of surely preventing leakage of a fluid, without deteriorating a sealing performance even when a situation of fall of surface pressure at a periphery edge of a through hole occurs is provided. There are formed a primary seal structure 31*a* lying on an inner side in the radial direction of a periphery edge end 29*a* and a secondary seal structure 32*a* lying on an outer side in the radial direction of the periphery edge end 29*a*, in which the primary seal structure 31*a* includes a primary upper layer bead 33*a* formed to an upper layer 21, a primary intermediate layer bead 34*a* formed to a second plate material 28 of an intermediate layer 22 and a primary lower layer bead 35*a* formed to a lower layer 23 stacked in an x direction, and the secondary seal structure 32*a* includes a secondary upper layer bead 36*a* formed to the upper layer 21, an secondary intermediate layer bead 37*a* formed to the second plate material 28 of the intermediate layer 22 and a secondary lower layer bead 38*a* formed to the lower layer 23 stacked in the x direction.

2 Claims, 4 Drawing Sheets

# GASKET

BACKGROUND

1. Technical Field

The present invention relates to a gasket, more particularly to a gasket having an improved sealing performance.

2. Related Art

As a gasket of a three-layer structure to be sandwiched between a cylinder head and a cylinder block, there is proposed one in which a folded portion enclosing a through hole is formed to an intermediate layer and seal beads enclosing the through hole and having symmetric shapes vertically with respect to the intermediate layer are formed, respectively, to an upper layer and a lower layer (for example, see Japanese Patent Application Laid-Open Publication No. 1999-118038 (Patent Literature 1)).

SUMMARY

Problems to be Solved by the Invention

Incidentally, in a gasket, there are problems such that distance between a cylinder head and a cylinder block broadens vertically when combustion pressure of gas in a cylinder rises to generate a head lift, and that sealing surface of the gasket inclines when an indentation is generated in the cylinder block and/or cylinder head due to deformation by an influence of cold heat in an engine operation. These broadening in vertical direction, and inclination of a sealing surface become a main cause of reduction of surface pressure at a periphery edge of the through hole.

However, in the gasket described in Patent Literature 1, no counterplan is considered with respect to these problems. Therefore, in the gasket, if such a situation as a fall of surface pressure at a periphery edge of a through hole occurs, combustion pressure can not sufficiently be reduced at a folded back part formed at the periphery edge of the through hole. As the result, with the seal beads formed to the upper layer and the lower layer, gas with high combustion pressure cannot be sealed, and there is a risk of leakage of the gas.

The present invention has been made in consideration of the above-described problems, and the object is to provide a gasket capable of surely preventing leakage of a fluid, without deteriorating a sealing performance even when a situation of fall of surface pressure at a periphery edge of a through hole occurs.

Means to Solve the Problem

The gasket of the present invention that accomplishing the above-described purpose is a gasket formed by stacking three layers of an upper layer, an intermediate layer and a lower layer from an upper side toward a lower side in this order, in which: a through hole passing through the three layers is formed, the intermediate layer is formed by stacking two plate materials, and a first plate material of the plate materials has a folded back part formed by being folded back so as to encompass an end part on the through hole side of a second plate material of the plate materials; a primary seal structure enclosing the through hole on an inner side in a radial direction of a periphery edge end on an outer side of the folded back part in the radial direction and a secondary seal structure enclosing the primary seal structure on the outer side in the radial direction of the periphery edge end are formed; the primary seal structure has a primary upper layer bead formed to the upper layer while protruding a top in one direction of upper and lower directions, a primary intermediate layer bead formed to the second plate material of the intermediate layer while protruding a top in the other direction opposite to the one direction and a primary lower layer bead formed to the lower layer while protruding a top in the one direction, and the primary upper layer bead, the primary intermediate layer bead and the primary lower layer bead are stacked in the upper and lower direction; and the secondary seal structure has a secondary upper layer bead formed to the upper layer while protruding a top in the one direction, a secondary intermediate layer bead formed to the second plate material while protruding a top in the other direction and a secondary lower layer bead formed to the lower layer while protruding a top in the one direction, and the secondary upper layer bead, the secondary intermediate layer bead and the secondary lower layer bead are stacked in the upper and lower direction.

ADVANTAGEOUS EFFECTS OF INVENTION

In the present invention, the primary seal structure including the primary upper layer bead, the primary intermediate layer bead and the primary lower layer bead each of which protrudes in alternate directions when the upper layer, the intermediate layer and the lower layer are stacked, and the secondary seal structure including the secondary upper layer bead, the secondary intermediate layer bead and the secondary lower layer bead each of which protrudes in alternate directions in the same way are arranged in this order from a through hole toward the outside in the radial direction. Therefore, according to the present invention, by the primary seal structure and the secondary seal structure, the part from the through hole toward the outside in the radial direction in which surface pressure becomes high can be doubled and sealing can be performed at two stages. Hereby, even if such a situation, where surface pressure at a periphery edge of the through hole falls, occurs to cause a fluid to pass through the primary seal structure, pressure of the fluid is advantageously reduced by the primary seal structure, and passing of the fluid whose pressure has been reduced by the primary seal structure can surely be prevented by the secondary seal structure.

BRIEF DESCRIPTION OF DRAWINGS

FIG. 4 illustrates a cross-sectional view exemplifying change in combustion pressure of gas, in which

DETAILED DESCRIPTION

Figure 1:
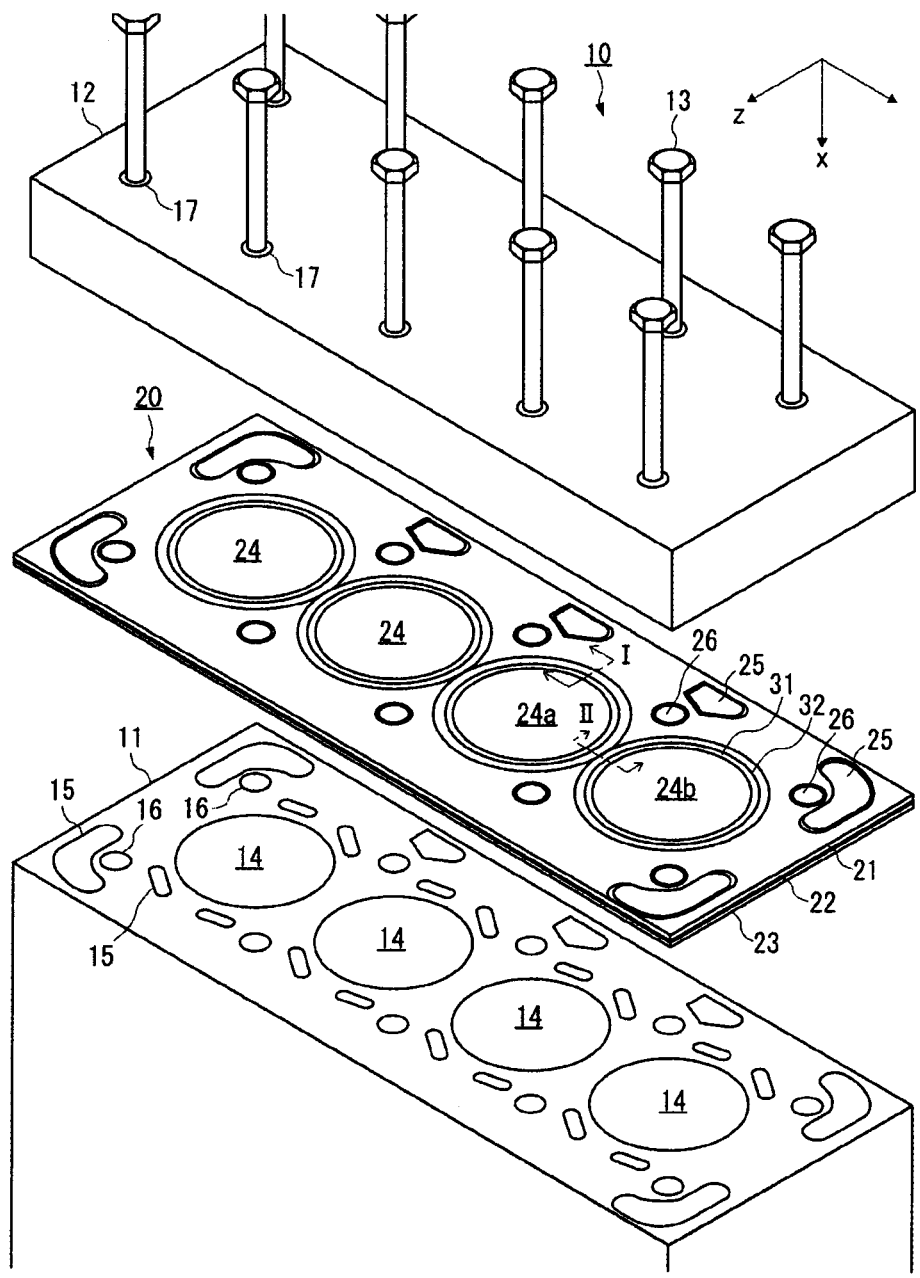
FIG. 1 illustrates a perspective view exemplifying an embodiment of the gasket of the present invention.

Hereinafter, embodiments of the present invention will be described with reference to the drawings. In the drawings, x shall be the vertical direction (the upper and lower directions) and a thickness direction (stack direction) of a gasket 20, and y and z shall be directions orthogonal to the x direction and orthogonal to each other. Incidentally, in FIGS. 1-4, dimensions are changed so that the configuration can be understood easily, and dimensions are not necessarily matched with ratios in products to be actually manufactured.

As exemplified in FIGS. 1-4, the gasket 20 of the embodiment is a cylinder head gasket that is to be assembled in an engine 10, lies between a cylinder block 11 and a cylinder head 12 and is fastened with a bolt 13.

As exemplified in FIG. 1, there are formed to the cylinder block 11, as holes to be sealed, four cylinder bores 14 and water/oil holes 15 such as a water hole for a water jacket and an oil hole for lubricating oil formed to an outer periphery of the cylinder bore 14. Inside the cylinder bore 14, a piston (not illustrated) is assembled to be reciprocally movable in the upper and lower directions. In the cylinder block 11, four bolt holes 16 are formed to one cylinder bore 14 in the outer periphery of the cylinder bore 14.

With respect to the cylinder head 12, an injector and intake/exhaust valve (not illustrated) are assembled, and a bolt hole 17 corresponding to the bolt hole 16 of the cylinder block 11 penetrates.

The gasket 20 includes three layers of an upper layer 21, an intermediate layer 22 and a lower layer 23 stacked in this order toward the lower side in the x direction, and is formed into a flat plate shape. In the gasket 20, through holes 24-26 are formed. The through hole 24 corresponds to the cylinder bore 14, the through hole 25 corresponds to the water/oil hole 15 and the through hole 26 corresponds to bolt holes 16 and 17, and the through holes 24-26 pass through all the layers of the upper layer 21, intermediate layer 22 and lower layer 23.

Hereinafter, through holes lying adjacent to each other in plan view are denoted by through holes 24a, 24b.

Figure 2:
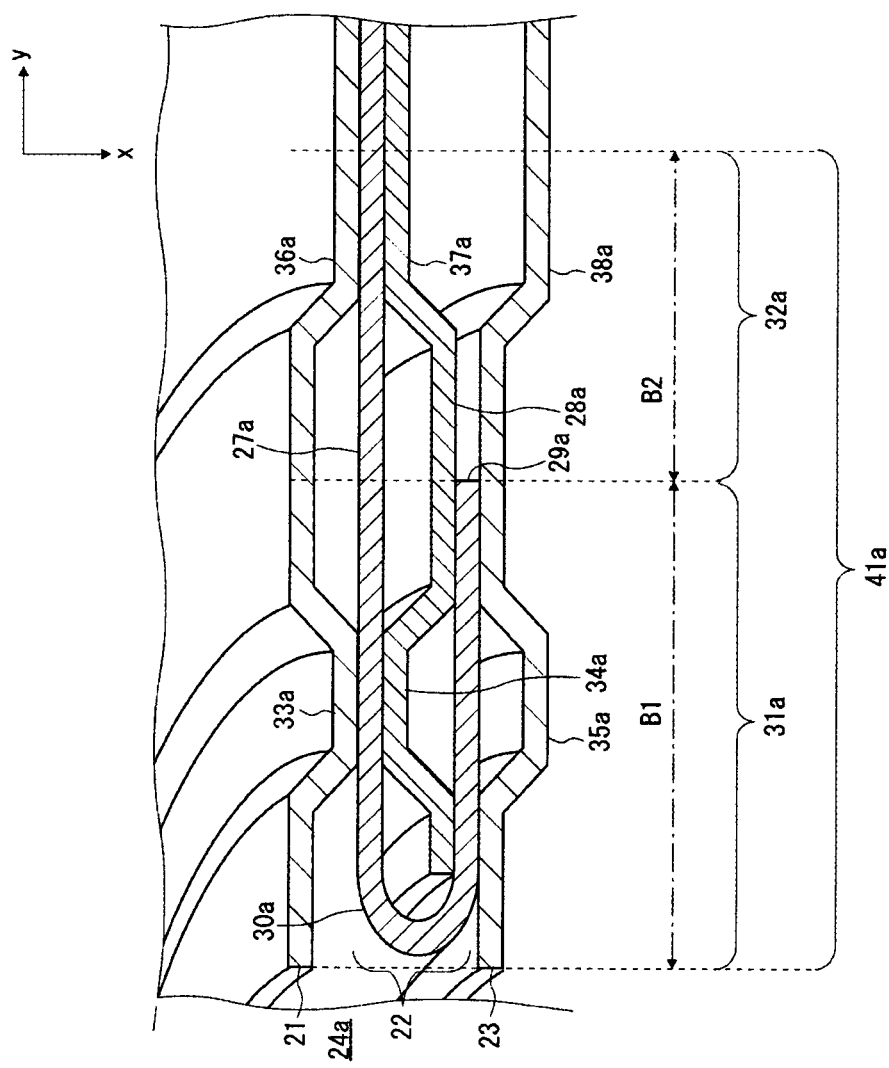
FIG. 2 illustrates a cross-sectional view shown by an arrow I in FIG. 1.

As exemplified in FIG. 2, each of the upper layer 21 and the lower layer 23 is configured of the single metal plate. Thicknesses of the upper layer 21 and the lower layer 23 may be different from each other. Examples of metal plates configuring the upper layer 21 and the lower layer 23 include an elastic metal plate made from stainless steel or the like.

The intermediate layer 22 is configured by stacking two plates of a first plate material 27 and a second plate material 28 in this order toward the lower side in the x direction in stacked-layer cross-sectional view. As metal plates configuring the first plate material 27 and the second plate material 28, metal plates made from iron alloys such as stainless steel and steel and those obtained by subjecting these metal plates to an annealing treatment are exemplified. They may be made from mutually different metals.

The first plate material 27 is folded back, by a bending work etc., so as to encompass an end part on the through hole 24 a side of the second plate material 28 to form a folded back part 30a. A periphery edge end 29a on the outside in the radial direction in the folded back part 30a is a periphery edge end of the first plate material 27 having been folded back. The folded back part 30a is formed in a grommet-like shape, while the first plate material 27 having been folded back includes the periphery edge end on the through hole 24a side of the second plate material 28.

The gasket 20 has a primary seal structure 31a and a secondary seal structure 32a each of which has an annular shape in plan view in this order from the through hole 24a toward the outside thereof in the radial direction. The through hole 24a, the primary seal structure 31a and the secondary seal structure 32a are arranged concentrically in plan view.

The primary seal structure 31a is arranged on the inner side in the radial direction of the periphery edge end 29a lying on the outer side in the radial direction of the first plate material 27 and encloses the through hole 24a. In the primary seal structure 31a, in stacked-layer cross-sectional view, a primary upper layer bead 33a, a primary intermediate layer bead 34a and a primary lower layer bead 35a are stacked toward the lower side in the x direction, and the primary intermediate layer bead 34a is included in the folded back part 30a.

The primary upper layer bead 33a is formed to the upper layer 21, the primary intermediate layer bead 34a is formed to the second plate material 28 of the intermediate layer 22, and the primary lower layer bead 35a is formed to the lower layer 23. Each of beads 33a-35a has an annular shape in plan view, is arranged on the inner side in the radial direction of the periphery edge end 29a, and encloses the through hole 24a.

The primary upper layer bead 33a, the primary intermediate layer bead 34a and the primary lower layer bead 35a are formed in a full bead over the whole perimeter in the perimeter direction of the through hole 24a. The full bead means a bead having a convex shape in which the top at the central part in stacked-layer cross-sectional view projects in the x direction of both end parts.

In the full beads of the primary upper layer bead 33a and the primary lower layer bead 35a, respectively, the top protrudes toward the lower side in the x direction, and, in the full bead of the primary intermediate layer bead 34a, the top protrudes toward the upper side in the x direction. In other words, the primary upper layer bead 33a and the primary intermediate layer bead 34a protrude in directions in which they come close to each other, the primary intermediate layer bead 34a and the primary lower layer bead 35a protrude in directions in which they separate from each other, and the primary upper layer bead 33a and the primary lower layer bead 35a protrude in the same direction.

Moreover, the primary upper layer bead 33a, the primary intermediate layer bead 34a and the primary lower layer bead 35a align in a row in the x direction. In other words, in the primary upper layer bead 33a, the primary intermediate layer bead 34a and the primary lower layer bead 35a, respective center positons in the y direction, which is the bead width direction, coincide with one another.

In the primary upper layer bead 33a, primary intermediate layer bead 34a and primary lower layer bead 35a in the embodiment, each full bead has an isosceles trapezoidal shape in stacked-layer cross-sectional view, and surfaces configuring respective tops face one another in the x direction. Incidentally, the full bead may have an arc-like shape or a triangular shape in stacked-layer cross-sectional view.

As described above, in the primary seal structure 31a, the primary upper layer bead 33a, the primary intermediate layer bead 34a and the primary lower layer bead 35a protrude in alternate directions from the upper side toward the lower side in the x direction.

Respective bead shapes of the primary upper layer bead 33a, the primary intermediate layer bead 34a and the primary lower layer bead 35a are desirably the same except for protruding directions of tops in stacked-layer cross-sectional views, and the bead heights and bead widths are desirably also the same. Specifically, the primary upper layer bead 33a and the primary intermediate layer bead 34a have symmetric shapes in vertical direction. The primary intermediate layer bead 34a and the primary lower layer bead 35a have symmetric shapes in vertical direction. The primary upper layer bead 33a and the primary lower layer bead 35a have the same shape in the protruding direction, width and height.

The secondary seal structure 32a is arranged on the outer side in the radial direction of the periphery edge end 29a lying on the outer side in the radial direction of the first plate material 27, and encloses the primary seal structure 31a. In the secondary seal structure 32a, in stacked-layer cross-sectional view, a secondary upper layer bead 36a, a secondary intermediate layer bead 37a and a secondary lower layer bead 38a are stacked toward the lower side in the x direction.

A secondary upper layer bead 36a is formed to the upper layer 21, a secondary intermediate layer bead 37a is formed to the second plate material 28 of the intermediate layer 22, and a secondary lower layer bead 38a is formed to the lower layer 23. Each of beads 36a-38a has an annular shape in plan view, and is arranged on the outer side in the radial direction of the periphery edge end 29a. The secondary upper layer bead 36a encloses the primary upper layer bead 33a, the secondary intermediate layer bead 37a encloses the primary intermediate layer bead 34a, and the secondary lower layer bead 38a encloses the primary lower layer bead 35a.

The secondary upper layer bead 36a, the secondary intermediate layer bead 37a and the secondary lower layer bead 38a are formed in a half bead over the whole perimeter in the perimeter direction of the primary seal structure 31a. The half bead means a bead having a slope that inclines with respect to the radial direction at the center portion in stacked-layer cross-sectional view, and either one of end parts bordering on the outer side or inner side in the radial direction of the slope forms a step-like shape projecting in the x direction with respect to the other end part.

In each half bead of the secondary upper layer bead 36a and the secondary lower layer bead 38a, the end part lying on the outer side in the radial direction of the slope protrudes toward the lower side in the x direction with respect to the end part lying on the inner side in the radial direction of the slope. In the half bead of the secondary intermediate layer bead 37a, the end part lying on the outer side in the radial direction of the slope protrudes toward the upper side in the x direction with respect to the end part lying on the inner side in the radial direction of the slope. In other words, the secondary upper layer bead 36a and the secondary intermediate layer bead 37a protrude in directions in which they come close to each other, the secondary intermediate layer bead 37a and the secondary lower layer bead 38a protrude in directions in which they separate from each other, and the secondary upper layer bead 36a and the secondary lower layer bead 38a protrude in the same direction.

Moreover, the secondary upper layer bead 36a, the secondary intermediate layer bead 37a and the secondary lower layer bead 38a align in a row in the x direction. In other words, in the secondary upper layer bead 36a, the secondary intermediate layer bead 37a and the secondary lower layer bead 38a, respective center positons in the y direction, which is the bead width direction, coincide with one another.

In the secondary upper layer bead 36a, the secondary intermediate layer bead 37a and the secondary lower layer bead 38a in the embodiment, each half bead has a crank-like shape in stacked-layer cross-sectional view. Specifically, the half bead has a "z-like" shape in which end parts bordering on both sides in the radial direction of the slope are formed flatly, and surfaces that are to form respective protruding end parts face each other in the x direction. Incidentally, the half bead may be formed into an "s-like" shape in which angles between end parts bordering on both sides of the slope in the radial direction and the slope are rounded in stacked-layer cross-sectional view.

As described above, in the secondary seal structure 32a, the secondary upper layer bead 36a, the secondary intermediate layer bead 37a and the secondary lower layer bead 38a protrude in alternate directions from the upper side toward the lower side in the x direction.

Respective bead shapes of the secondary upper layer bead 36a, the secondary intermediate layer bead 37a and the secondary lower layer bead 38a are desirably the same except for protruding directions of tops in stacked-layer cross-sectional views, and the bead heights and bead widths are desirably also the same. In other words, the secondary upper layer bead 36a and the secondary intermediate layer bead 37a have symmetric shapes in vertical direction. The secondary intermediate layer bead 37a and the secondary lower layer bead 38a have symmetric shapes in vertical direction. The secondary upper layer bead 36a and the secondary lower layer bead 38a have the same shape in the protruding direction, width and height.

Figure 3:
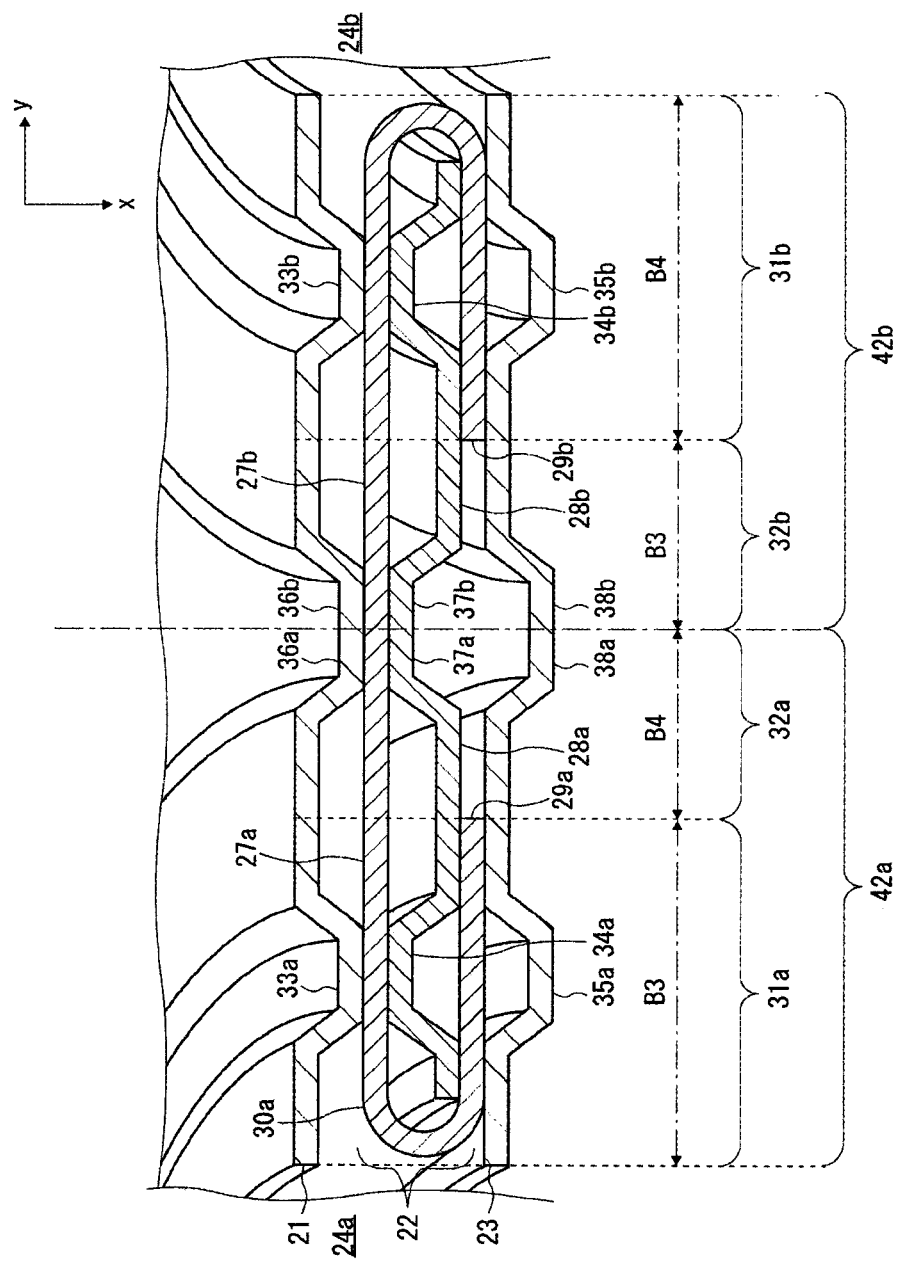
FIG. 3 illustrates a cross-sectional view shown by an arrow II in FIG. 1.

As exemplified in FIG. 3, a primary seal structure 31b enclosing a through hole 24b lying adjacent to the through hole 24a is also configured in the same way as the primary seal structure 31a, and a secondary seal structure 32b is also configured in the same way as the secondary seal structure 32a.

In the region between the through holes 24a and 24b lying adjacent to each other, the height of the top of the secondary upper layer bead 36a enclosing the one through hole 24a coincides with the height of the top of a secondary upper layer bead 36b enclosing the other through hole 24b, and the secondary upper layer bead 36a meets the secondary upper layer bead 36b. In the same way, the secondary intermediate layer beads 37a and 37b meet each other, and the secondary lower layer beads 38a and 38b meet each other. In other words, between the through holes 24a and 24b lying adjacent to each other, the secondary seal structures 32a and 32b border each other and function as one seal structure. When they are assumed as one seal structure, in the seal structure, three full beads are formed and are arranged in order in the upper and lower directions in stacked-layer cross-sectional view.

The boundary between the secondary upper layer beads 36a and 36b, boundary between the secondary intermediate layer beads 37a and 37b, and boundary between the secondary lower layer beads 38a and 38b are aligned in one line in the x direction. In other words, the center portions in the y direction of three full beads, which are formed when the secondary seal structures 32a and 32b border each other and form one seal structure, coincide one another. In the embodiment, three full beads have an isosceles trapezoidal shape in stacked-layer cross-sectional view, and surfaces configuring respective tops face one another in the x direction. Incidentally, the three full beads formed by causing the secondary seal structures 32a and 32b to meet each other may have an arc-like shape or a triangular shape in stacked-layer cross-sectional view.

Figure 4A:
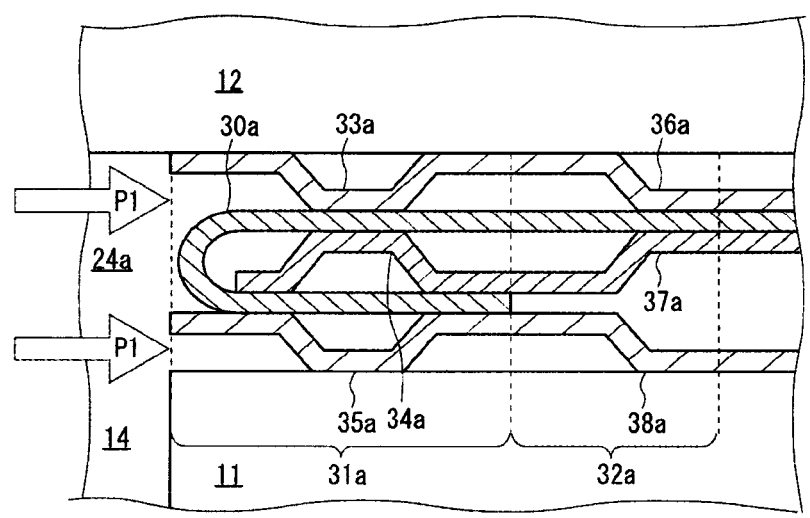
FIG. 4(a) shows a state where no head lift is generated.

As exemplified in FIG. 4(a), when head lift is not generated, the surface pressure of the primary seal structure 31a formed inside of the periphery edge end 29a in the radial direction is high. Therefore, even when a combustion pressure P1 of a gas generated in the cylinder bore 14 is high, the gas is intercepted by the primary seal structure 31a and does not leak to the outside in the radial direction.

Figure 4B:
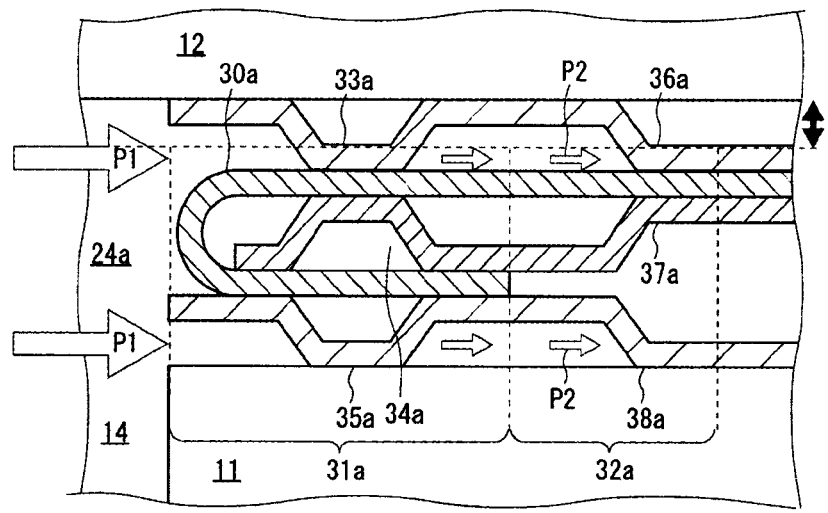
FIG. 4(b) shows a state where head lift is generated.

As exemplified in FIG. 4(b), when head lift is generated, a state where the cylinder head 12 is elevated toward the upper side in the x direction happens and the surface pressure of the primary seal structure 31a is reduced as compared with the above-described state. At this time, in the primary seal structure 31a, heights of three full beads become higher than those in the aforementioned state to keep a certain surface pressure. Therefore, the combustion pressure P1 of the gas is reduced to a pressure P2 when the gas passes through the primary seal structure 31a. Then, the gas having the pressure P2 reduced by the primary seal structure 31a is intercepted by the secondary seal structure 32a and does not leak to the outside of the secondary seal structure 32a in the radial direction.

As described above, the gasket 20 includes the primary seal structure 31a in which protruding directions of full beads are alternate and the secondary seal structure 32a in which protruding directions of half beads are alternate, which are arranged in this order from the through hole 24a toward the outside in the radial direction thereof.

Therefore, by the primary seal structure 31a and the secondary seal structure 32a, the part from the through hole 24a toward the outside in the radial direction in which surface pressure becomes high is doubled and sealing can be performed in two stages.

Hereby, even when such a situation that reduction of the surface pressure at periphery edge of the through hole 24a occurs by head lift to allow a gas burnt in the cylinder bore 14 to pass through the primary seal structure 31a, the combustion pressure P1 of the gas is advantageously reduced by the primary seal structure 31a, and passage of the gas having the reduced pressure can surely be prevented by the secondary seal structure 32a.

Incidentally, examples of situations where the surface pressure at periphery edge of the through hole 24a is reduced includes, in addition to the head lift exemplified in this embodiment, deformations of the cylinder block 11 and/or the cylinder head 12 due to the influence of the cold heat in operation.

In the primary seal structure 31a and the secondary seal structure 32a, by stacking, alternately in protruding directions, three beads 33a-35a and three beads 36a-38a formed to each of the upper layer 21, the intermediate layer 22 and the lower layer 23, the deformation amount in the x direction can be made large. Hereby, it is advantageous to ensure followability to situations leading to the reduction of the surface pressure at the periphery, edge of the through hole 24a such as change in the broadening between the cylinder block 11 and the cylinder head 12 due to the head lift and/or change in the inclination of sealing surface due to strain.

It is sufficient that the primary seal structure 31a and the secondary seal structure 32a have at least three beads and these are stacked alternately in the protruding directions. For example, when the intermediate layer 22 is made from three plate materials, beads are formed to each of plate materials other than a plate material of folded back portion, and plate materials are stacked while protruding directions of four beads are set to be alternate, protruding directions of beads formed to the upper layer 21 and the lower layer 23 face opposite directions each other.

In particular, by including the primary intermediate layer bead 34a in the folded back part 30a, the primary seal structure 31a can keep the height of the folded back part 30a in the x direction. Hereby, the surface pressure of the folded back part 30a can be increased advantageously, and the reduction of surface pressure caused by the primary seal structure 31 when the reduction of the surface pressure at a periphery edge of the through hole 24 occurs can effectively be suppressed.

Moreover, by meeting respective half beads configuring the secondary seal structures 32a and 32b between the through holes 24a and 24b, even when the space between the through holes 24a and 24b is narrow, sealing can be performed in two stages with respect to each of the through holes 24a and 24b. Hereby, it is advantageously avoided to allow coming and going of a gas between the through holes 24a and 24b.

In the above-described embodiment, a similar double seal structure may also be applied to a periphery edge of a through hole 25 corresponding to the water/oil hole.

The above-described gasket 20 may be applied to gaskets having the through hole 24 such as a gasket for a flange and a gasket for an exhaust manifold, without limitation to a cylinder head gasket.

In the above-described embodiment, the first plate material 27 may be turned upside down in the intermediate layer 22. Moreover, such a structure is also possible in the primary seal structure 31a that the tops of each full bead of the primary upper layer bead 33a and the primary lower layer bead 35a are made to protrude upward in the x direction and the top of the full bead of the primary intermediate layer bead 34a is made to protrude downward in the x direction. In this case, in the secondary seal structure 32a, favorably the tops of each full bead of the secondary upper layer bead 36a and the secondary lower layer bead 38a are made to protrude upward in the x direction and the top of the full bead of the secondary intermediate layer bead 37a is made to protrude downward in the x direction.

Shapes of respective beads 33a-38b, 33b-38b in stacked-layer cross-sectional view are not particularly limited.

In the above-described embodiment, respective half beads configuring the secondary seal structures 32a and 32b are made to meet each other in a part where the space becomes narrow between the through holes 24a and 24b, but the length for making respective half beads to meet each other may be set to be long. Specifically, in a part where the space becomes narrow between the through holes 24a and 24b, respective half beads may be formed in a linear shape in plan view to set the meeting length to be longer.

REFERENCE SIGNS LIST 20 gasket
21 upper layer
22 intermediate layer
23 lower layer
24a, 24b through hole
27 first plate material
28 second plate material
29a, 29b periphery edge end
30a, 30b folded back part
31a, 31b primary seal structure
32a, 32b secondary seal structure
33a, 33b primary upper layer bead
34a, 34b primary intermediate layer bead
35a, 35b primary lower layer bead
36a, 36b secondary upper layer bead
37a, 37b secondary intermediate layer bead
38a, 38b secondary lower layer bead

What is claimed is:

1. A gasket formed by stacking three layers of an upper layer, an intermediate layer and a lower layer from an upper side toward a lower side in this order, wherein:
   a through hole passing through the three layers is formed, the intermediate layer is formed by stacking two plate materials, and a first plate material of the plate materials has a folded back part formed by being folded back so as to encompass an end part on the through hole side of a second plate material of the plate materials;
   a primary seal structure enclosing the through hole on an inner side in a radial direction of a periphery edge end on an outer side of the folded back part in the radial direction and a secondary seal structure enclosing the primary seal structure on the outer side in the radial direction of the periphery edge end are formed;

the primary seal structure has a primary upper layer bead formed to the upper layer while protruding a top in one direction of upper and lower directions, a primary intermediate layer bead formed to the second plate material of the intermediate layer while protruding a top in the other direction opposite to the one direction and a primary lower layer bead formed to the lower layer while protruding a top in the one direction, and the primary upper layer bead, the primary intermediate layer bead and the primary lower layer bead are stacked in the upper and lower directions; and the secondary seal structure has a secondary upper layer bead formed to the upper layer while protruding a top in the one direction, a secondary intermediate layer bead formed to the second plate material while protruding a top in the other direction and a secondary lower layer bead formed to the lower layer while protruding a top in the one direction, and the secondary upper layer bead, the secondary intermediate layer bead and the secondary lower layer bead are stacked in the upper and lower directions.

2. The gasket according to claim 1, wherein the secondary upper layer bead, the secondary intermediate layer bead, and the secondary lower layer bead are configured of a half bead, and in a region between the through holes adjacent to each other, each of the secondary upper layer beads enclosing each of through holes meets each other, each of the secondary intermediate layer beads enclosing each of through holes meets each other, and each of the secondary lower layer beads enclosing each of through holes meets each other, to thereby form three full beads are arranged in the upper and lower directions.

* * * * *